United States Patent
Chin et al.

(10) Patent No.: US 8,265,661 B2
(45) Date of Patent: Sep. 11, 2012

(54) METHODS AND SYSTEMS FOR IDLE MODE OPERATION IN MULTI-MODE MOBILE STATIONS

(75) Inventors: Tom Chin, San Diego, CA (US); Guangming Carl Shi, San Diego, CA (US); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 719 days.

(21) Appl. No.: 12/369,721

(22) Filed: Feb. 11, 2009

(65) Prior Publication Data

US 2010/0202430 A1 Aug. 12, 2010

(51) Int. Cl.
*H04W 68/00* (2009.01)
*H04B 1/38* (2006.01)
*H04B 7/216* (2006.01)
*H04J 3/00* (2006.01)

(52) U.S. Cl. ......... 455/458; 455/574; 370/342; 370/345

(58) Field of Classification Search .................. 455/458, 455/574; 370/342, 345
See application file for complete search history.

(56) References Cited

U.S. PATENT DOCUMENTS

| 6,282,178 | B1 | 8/2001 | Noerpel et al. |
| 6,826,400 | B1 | 11/2004 | Cashman et al. |
| 2004/0185857 | A1 | 9/2004 | Lee et al. |
| 2008/0261628 | A1* | 10/2008 | Proctor et al. ............... 455/458 |
| 2009/0081962 | A1* | 3/2009 | Sohrabi .......................... 455/79 |
| 2009/0176513 | A1* | 7/2009 | Bosch et al. ................ 455/458 |

OTHER PUBLICATIONS

International Search Report and Written Opinion—PCT/US2010/023952, International Search Authority—European Patent Office—Aug. 12, 2010.

* cited by examiner

*Primary Examiner* — Kamran Afshar
*Assistant Examiner* — Omoniyi Obayanju
(74) *Attorney, Agent, or Firm* — Tyler Overall

(57) ABSTRACT

Certain embodiments of the present disclosure provide techniques for a multi-mode mobile station to establish paging intervals in different radio access technology (RAT) networks in an effort to avoid consecutive collisions between paging intervals of a first and a second network.

48 Claims, 13 Drawing Sheets

| Slot Cycle | Slots | CC Cycles | Sleep Period (sec) |
|---|---|---|---|
| 0 | 4 | 0.015625 | 0.006667 |
| 1 | 8 | 0.03125 | 0.013333 |
| 2 | 16 | 0.0625 | 0.026667 |
| 3 | 32 | 0.125 | 0.053333 |
| 4 | 64 | 0.25 | 0.106667 |
| 5 | 128 | 0.5 | 0.213333 |
| 6 | 256 | 1 | 0.426667 |
| 7 | 768 | 3 | 1.28 |
| 8 | 1536 | 6 | 2.56 |
| 9 | 3072 | 12 | 5.12 |
| 10 | 6144 | 24 | 10.24 |
| 11 | 12288 | 48 | 20.48 |
| 12 | 24576 | 96 | 40.96 |
| 13 | 49152 | 192 | 81.92 |
| 14 | 98304 | 384 | 163.84 |
| 15 | 196608 | 768 | 327.68 |

METHODS AND SYSTEMS FOR IDLE MODE OPERATION IN MULTI-MODE MOBILE STATIONS

TECHNICAL FIELD

Certain embodiments of the present disclosure generally relate to wireless communication and, more particularly, to a multi-mode mobile stations entering into an idle mode.

SUMMARY

Certain embodiments provide a method for communicating, by a multi-mode mobile station (MS), with first and second networks via first and second radio access technologies (RATs). The method generally includes determining a first paging cycle for the first network, determining a second paging cycle for the second network in an effort to avoid consecutive collisions between paging intervals of the first and second networks, wherein the second paging cycle is determined based on a scaling factor applied to the first paging cycle and an offset value, and communicating the second paging cycle to a base station (BS) of the second network in a request to establish the paging interval of the second network.

Certain embodiments provide an apparatus for communicating, by a multi-mode mobile station (MS), with first and second networks via first and second radio access technologies (RATs). The apparatus generally includes logic for determining a first paging cycle for the first network logic for determining a second paging cycle for the second network in an effort to avoid consecutive collisions between paging intervals of the first and second networks, wherein the second paging cycle is determined based on a scaling factor applied to the first paging cycle and an offset value, and logic for communicating the second paging cycle to a base station (BS) of the second network in a request to establish the paging interval of the second network.

Certain embodiments provide an apparatus for communicating, by a multi-mode mobile station (MS), with first and second networks via first and second radio access technologies (RATs). The apparatus generally includes means for determining a first paging cycle for the first network, means for determining a second paging cycle for the second network in an effort to avoid consecutive collisions between paging intervals of the first and second networks, wherein the second paging cycle is determined based on a scaling factor applied to the first paging cycle and an offset value, and means for communicating the second paging cycle to a base station (BS) of the second network in a request to establish the paging interval of the second network.

Certain embodiments provide a computer-program product for communicating, by a multi-mode mobile station (MS), with first and second networks via first and second radio access technologies (RATs), comprising a computer readable medium having instructions stored thereon, the instructions being executable by one or more processors. The instructions generally include instructions for determining a first paging cycle for the first network, instructions for determining a second paging cycle for the second network in an effort to avoid consecutive collisions between paging intervals of the first and second networks, wherein the second paging cycle is determined based on a scaling factor applied to the first paging cycle and an offset value, and instructions for communicating the second paging cycle to a base station (BS) of the second network in a request to establish the paging interval of the second network.

In certain embodiments presented herein, such as those presented within these summary paragraphs, at least one of the first and second RATs comprises a RAT in accordance with one or more standards of the Institute of Electrical and Electronics Engineers (IEEE) 802.16 family of standards.

In certain embodiments presented herein, such as those presented within these summary paragraphs, at least one of the first and second RATs comprises a code division multiple access (CDMA) RAT.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
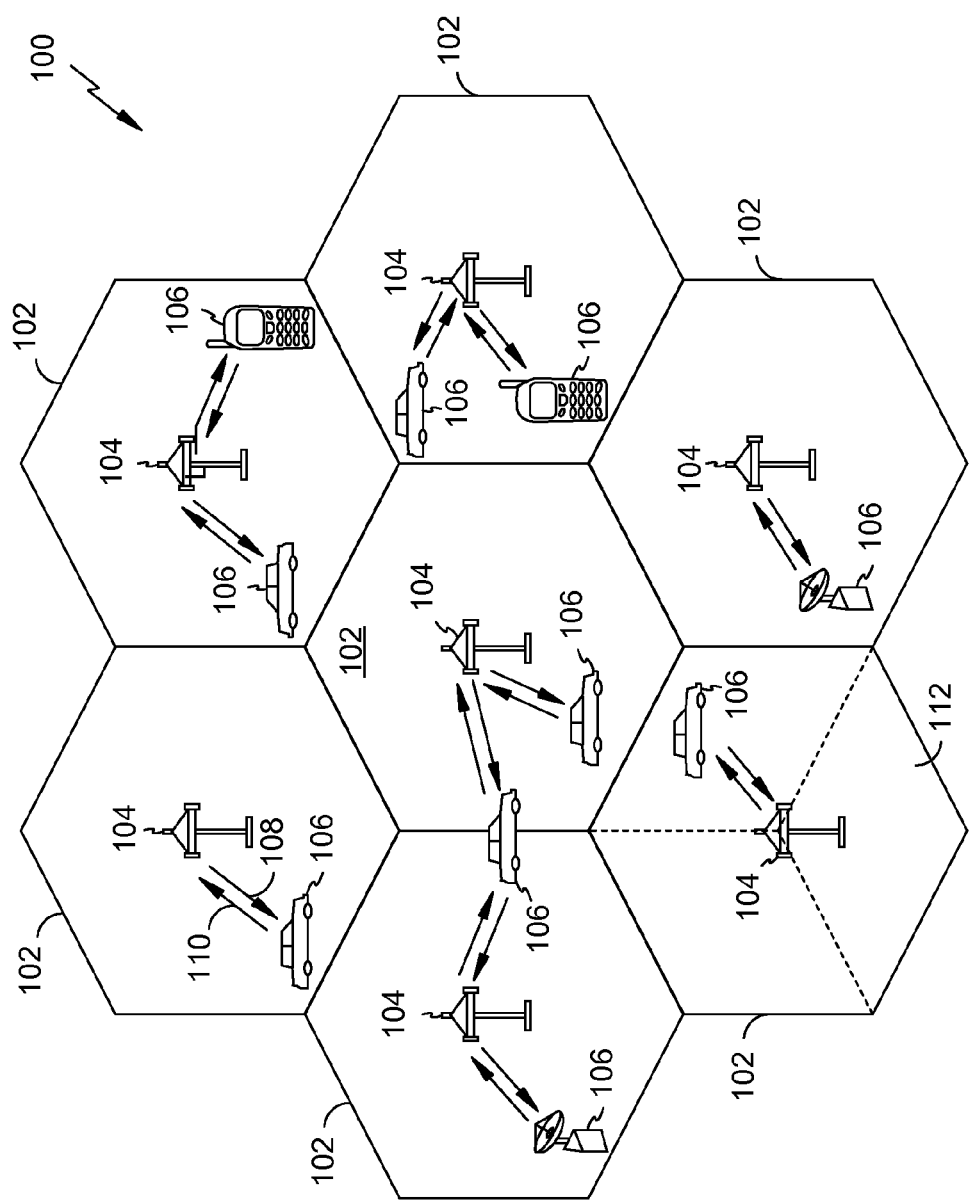
FIG. 1 illustrates an example wireless communication system, in accordance with certain embodiments of the present disclosure.

Orthogonal frequency-division multiplexing (OFDM) and orthogonal frequency division multiple access (OFDMA) wireless communication systems, such as those compliant with the IEEE 802.16 family of standards, typically use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

In order to expand the services available to subscribers, some MSs support communications with multiple radio access technologies (RATs). For example, a multi-mode MS may support WiMAX for broadband data services and code division multiple access (CDMA) for voice and data services.

As a result of supporting multiple RATs, there may be instances in which a multi-mode MS may be in idle mode in both the CDMA and the WiMAX networks. This may require the MS to listen for paging messages in both networks. Unfortunately, a multi-mode MS with a single RF chain may only listen to one system at a time.

Embodiments of the present disclosure generally relate to multi-mode mobile stations entering into an idle mode.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
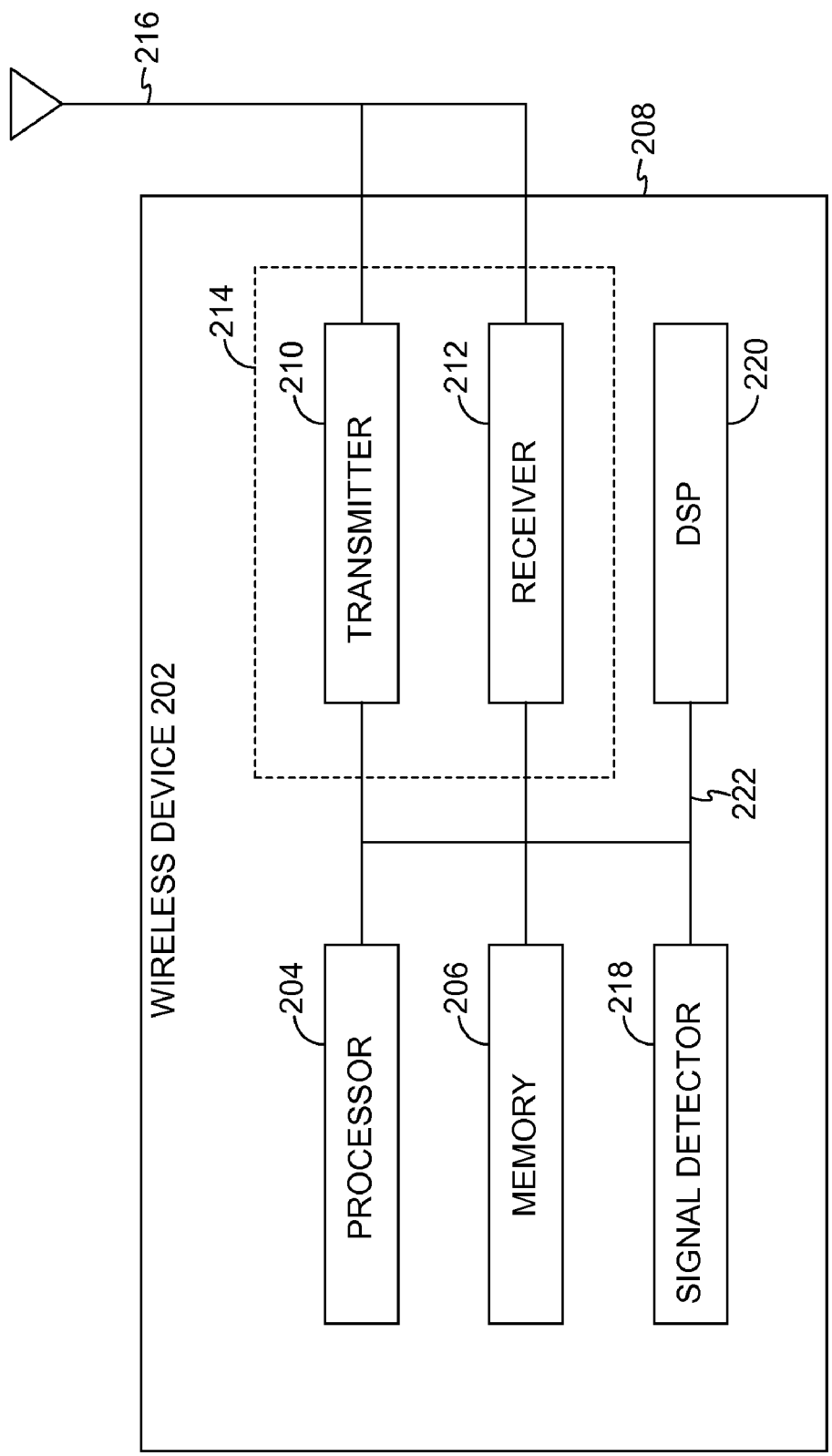
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
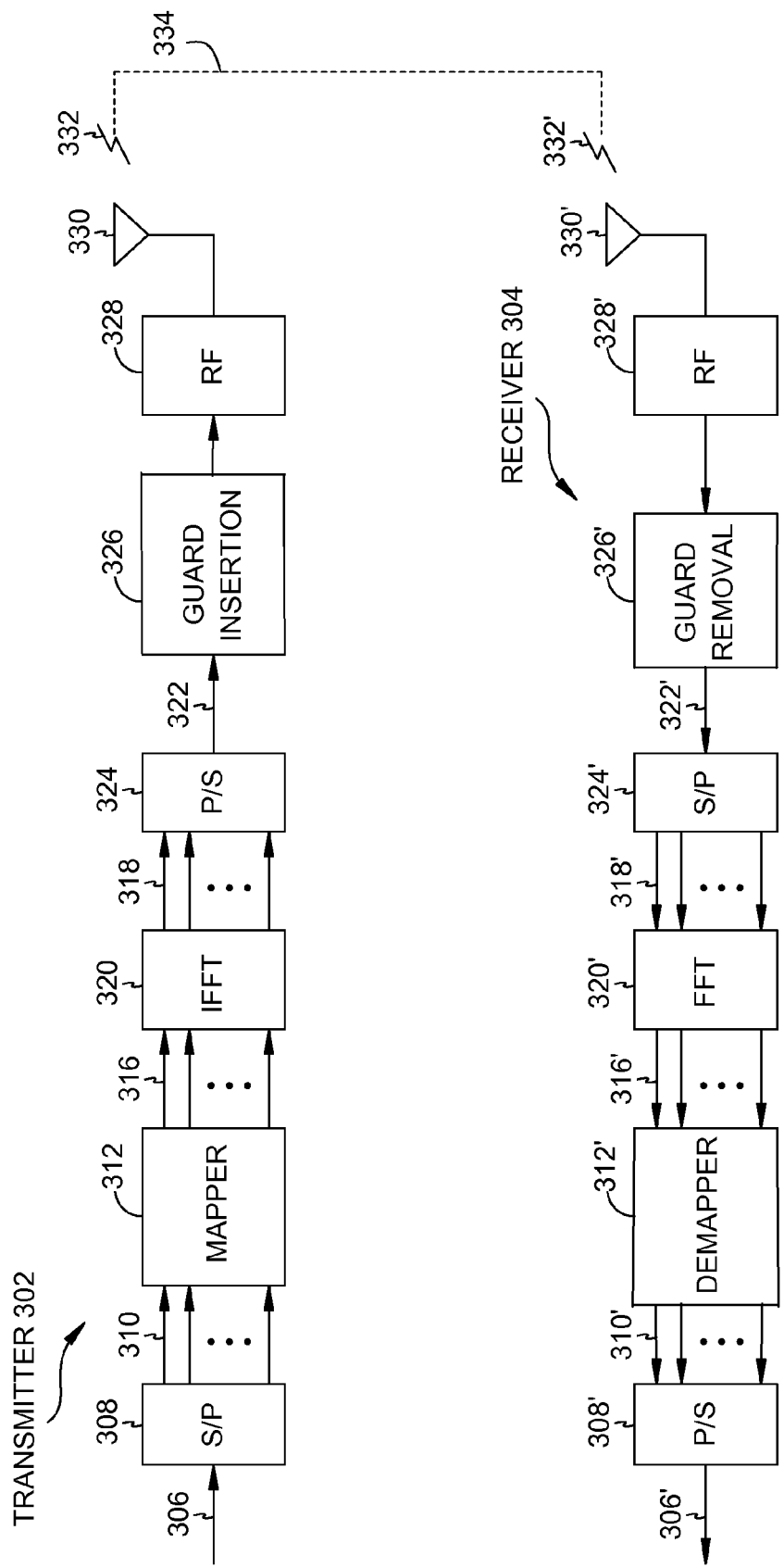
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Idle Mode Operation for Multi-Mode Mobile Stations

As previously mentioned, in the deployment of wireless services, different radio access technologies (RATs) may be combined to provide multiple services. For example, a multi-mode MS may support WiMAX for broadband data services and code division multiple access (CDMA) for voice and data services. This may result in instances in which the multi-mode MS may be in idle mode in both the CDMA and the WiMAX networks, requiring the MS to listen for paging messages in both networks.

Unfortunately, a multi-mode MS with a single RF chain may only listen to one system at a time, and there is also a very low probability that the CDMA and WiMAX networks are naturally configured so as to prevent an overlap of their respective paging intervals. Consequently, there may be instances in which a conventional MS with a single RF chain may miss one or more paging intervals of at least one of its supported networks due to a conflict between the paging intervals of said networks.

Moreover, there are at least two distinct RATs that employ a CDMA channel access method. For example, some voice services may employ a CDMA "1 times radio transmission technology," or CDMA 1× technology, while other voice and data services may employ a CDMA "Evolution-Data Optimized" technology, or CDMA EVDO technology. Unfortunately, the 1× and EVDO technologies differ with respect to idle mode parameters available for negotiation between the MS and corresponding BS. The consequences of these differences will be elaborated on later in the disclosure.

However, embodiments of the present disclosure may enable a multi-mode MS to configure a paging cycle between the MS and one or more of the RATs such that the paging intervals of one RAT do not conflict with the paging intervals of other supported RATs.

Figure 4:
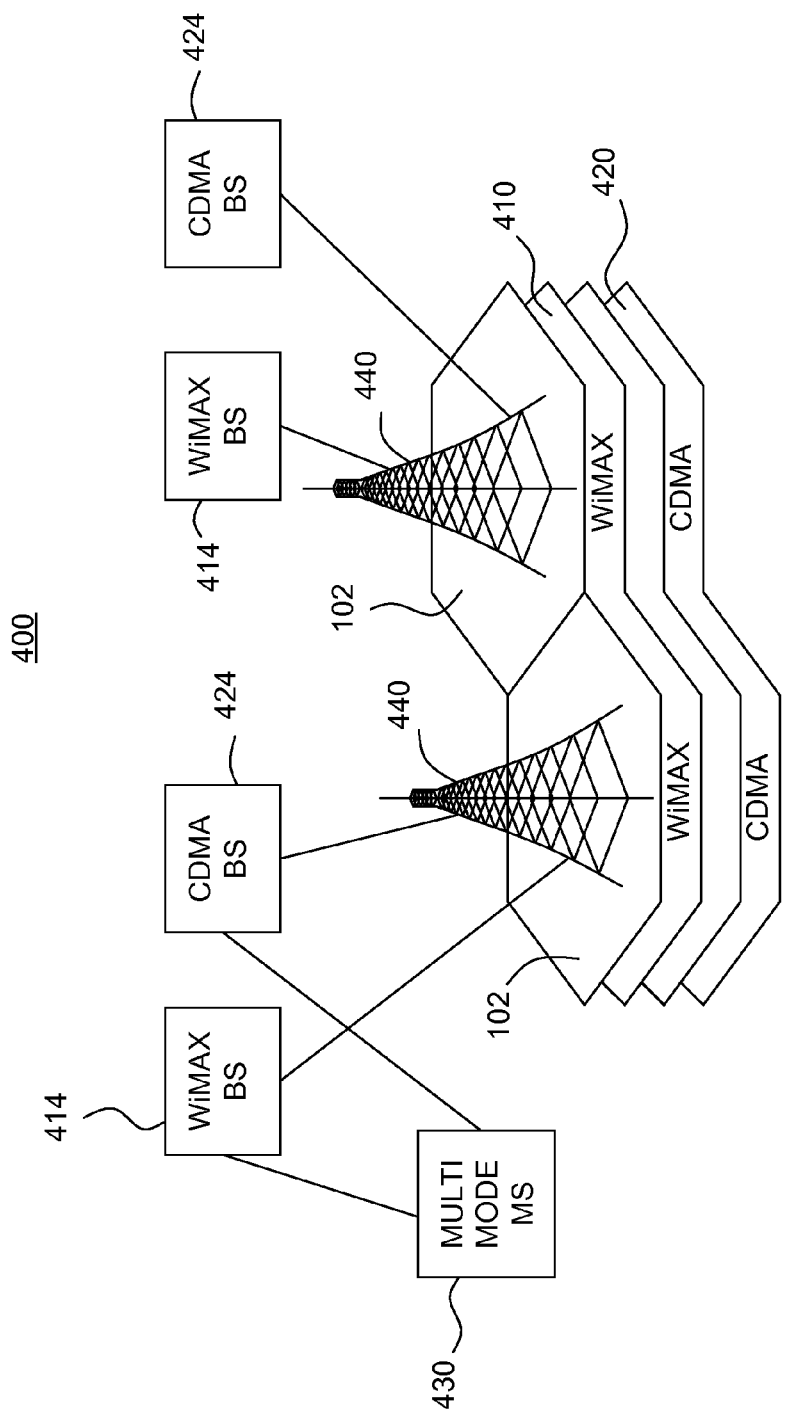
FIG. 4 illustrates an example WiMAX network overlaid on a code division multiple access (CDMA) 1× network.

FIG. 4 illustrates an example system 400 in which an asynchronous mobile WiMAX network 410 may be combined with (or "overlaid" on) a CDMA network 420 to provide both broadband data and voice service. In the system, subscribers may utilize a single multi-mode (CDMA and WiMAX) mobile station (MS) 430 to tune to the CDMA network to utilize a voice or data service and to tune to the WiMAX network to utilize a broadband data service.

FIG. 4 further illustrates that CDMA service may be provided to a geographic area by a plurality of hardware and software components. This geographic area may be divided into regions, referred to as cells, centered around a service tower 440. In an attempt to increase spatial efficiency, a single service tower 440 may support multiple RATs. For example, a service tower 440 may support both a WiMAX base station (BS) 414 as well as a CDMA BS 424.

Figure 5:
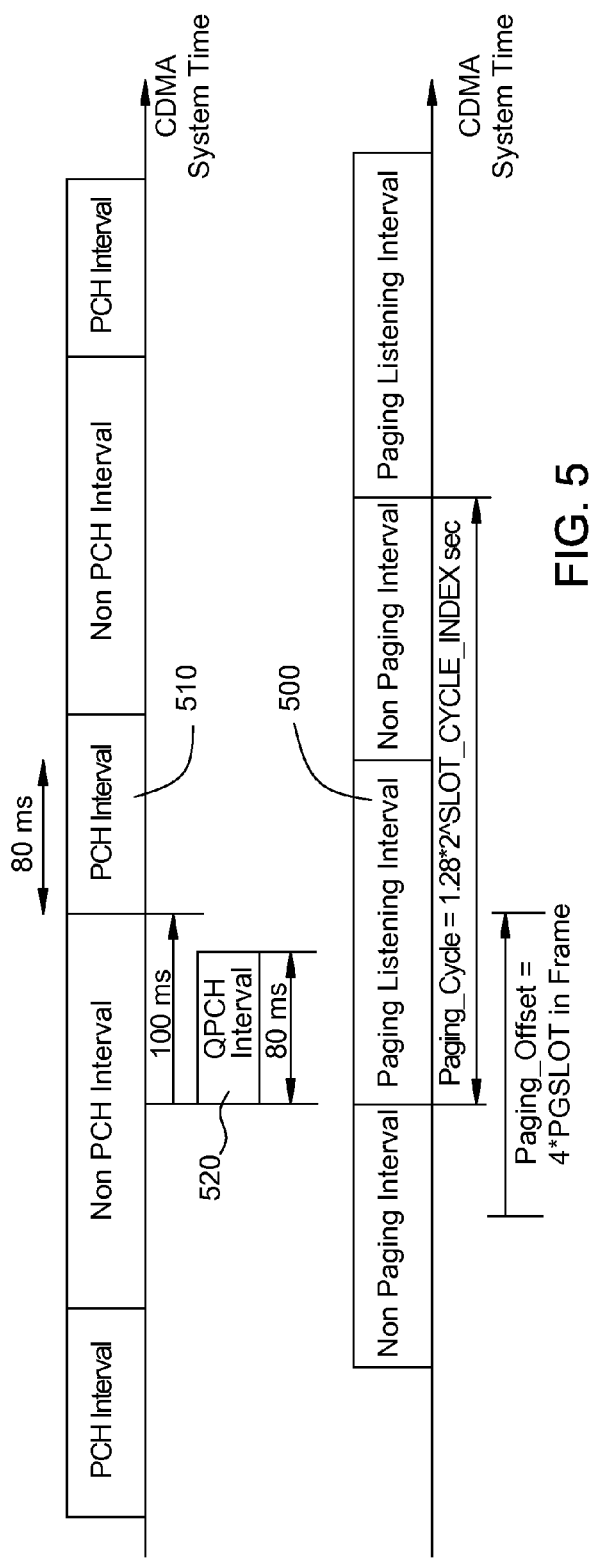
FIG. 5 illustrates some of the components of a CDMA paging cycle.

In the CDMA 1× network, as in the WiMAX network, an MS 430 in idle mode may listen for paging messages in certain recurrent paging intervals. FIG. 5 illustrates a CDMA 1× paging listening interval 500 for listening to an 80 ms paging channel (PCH) interval 510 preceded by listening to a 100 ms quick paging channel (QPCH) interval 520. Accordingly, the MS 430 may need to listen for paging messages for a 180 ms time interval per paging cycle. The beginning CDMA system time t of the PCH interval that the MS 430 may need to listen to, in units of 20 ms frames, can be determined by Equation 1:

$$t \bmod [64 * 2^{SLOT\_CYCLE\_INDEX}] = 4 * PGSLOT \quad (1)$$

In Equation 1, the function "mod" or x modular y is defined by the remainder of x divided by y. The parameter PGSLOT is a function of International Mobile Subscriber Identity (IMSI). However, to account for the QPCH, the MS may begin to listen for paging messages five frames prior to t.

Additionally, the above parameter SLOT_CYCLE_INDEX may be any integer value between 0 and 7 and may be used by the MS 430 to determine the length of a paging cycle, where the paging cycle consists of a paging listening interval 500 and a non-paging interval. Specifically, the MS may select a SLOT_CYCLE_INDEX and employ it in the application of Equation 2:

$$\text{Paging\_Cycle} = 1.28 * 2^{SLOT\_CYCLE\_INDEX} \text{ (sec)}, \quad (2)$$

to determine the length of the paging cycle. However, it should be noted that the CDMA BS 424 may limit the maximum value of the SLOT_CYCLE_INDEX by broadcasting the maximum of SLOT_CYCLE_INDEX in a System Parameter Message.

Figure 6:
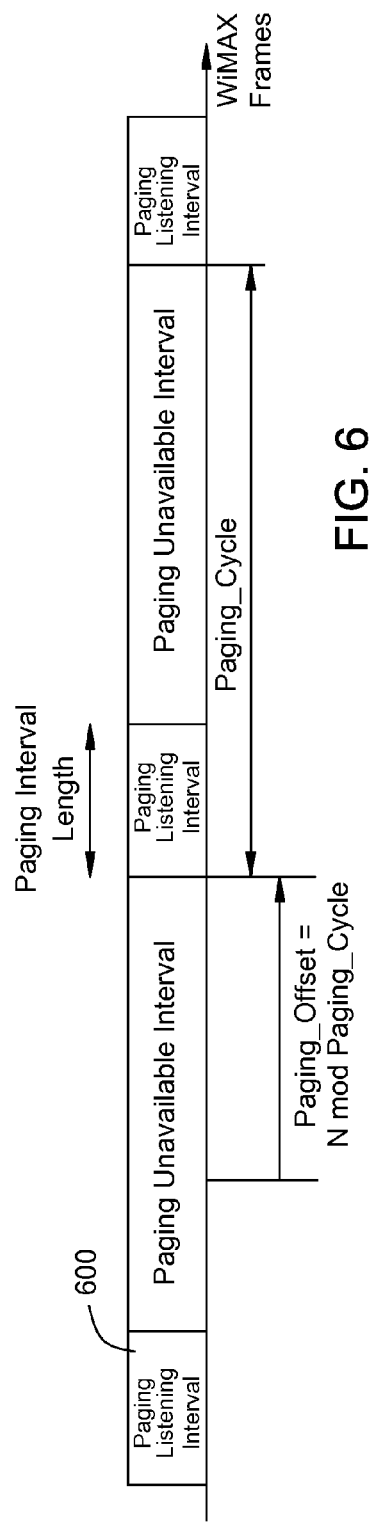
FIG. 6 illustrates some of the components of a WiMAX paging cycle.

Similar to the MS 430 in the CDMA 1× network 420, an MS 430 in an idle mode of the WiMAX network 410 may listen to certain recurrent paging intervals, as illustrated in FIG. 6. However, unlike with CDMA 1× networks, the IEEE 802.16 standard does not provide for a quick paging channel in a WiMAX network 410. Accordingly, after determining the start of the BS broadcast page advertisement (MOB_PAG-ADV) message from WiMAX frame number N, as described by Equation 3:

$$N \bmod [\text{Paging\_Cycle}] = \text{Paging\_Offset}_{WiMAX}, \quad (3)$$

the MS 430 may not have to account for the QPCH. Instead, the duration of the paging listening interval 600 may be limited to a maximum of 5 frames subsequent to the frame number N.

The current IEEE 802.16 standard limits the MS 430 such that the MS 430 may only propose a paging cycle to a WiMAX BS via a deregistration request (DREG-REQ). Instead, the IEEE 802.16 standard enables the WiMAX BS to assign a paging offset, paging interval length, and paging cycle to an MS 430, via a deregistration command (DREG-CMD), prior to the MS entering an idle mode.

Exemplary CDMA 1× and Asynchronous WiMSXC Overlaid Networks

For certain embodiments, WiMAX paging parameters may be selected in an attempt to avoid collisions between CDMA and WiMAX paging intervals since a MS with a single RF circuit would only be able to listen to one of the paging intervals at a time.

However, in an asynchronous WiMAX network 410, the 24 bit frame number is not maintained among the plurality of base stations, meaning different BSs will not have identical frame numbers at the same time. Because the WiMAX paging offset is determined by the frame number, this means that in an asynchronous system, a change in BS will result in a different spacing between paging intervals even if the overall paging cycle period is maintained.

As a result, even if WiMAX and CDMA paging intervals were somehow free of conflict (with no overlap between paging intervals) for a given WiMAX BS, a conflict may occur when changing to another BS.

Further, wireless networks commonly implement paging retry protocols that allow a BS to make a second paging attempt after failing to page an MS 430 a first time. Unfortunately, collisions between WiMAX and CDMA paging intervals may prevent the retry of the paging from succeeding.

However, certain embodiments of the present disclosure may allow paging parameters of a WiMAX paging cycle to be selected in a manner designed to reduce the likelihood of collisions and, in the event of a collision, help avoid consecutive collisions. As will be described in greater detail below, an offset value T may be calculated and used to expand or contract a calculated WiMAX paging cycle in an effort to ensure consecutive WiMAX listening intervals do not collide with CDMA listening intervals.

By preventing consecutive conflicts between the WiMAX paging listening interval 600 and the CDMA 1× paging listening interval 500 a BS employing a paging retry protocol may successfully page the MS on a second attempt and a multimode MS 430 with a single RF chain may be able to successfully listen to the paging listening intervals in both systems.

Figure 7:
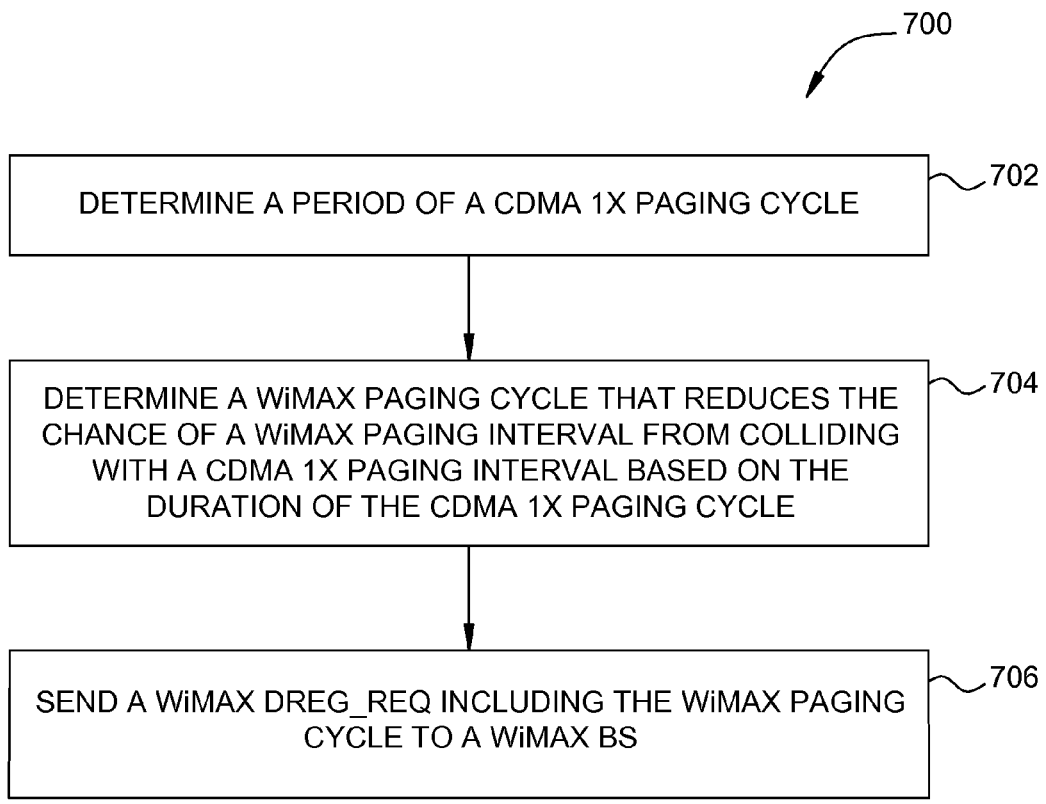
FIG. 7 illustrates example operations for configuring a WiMAX paging interval.

FIG. 7 illustrates example operations 700 that may be performed, for example, by a multi-mode MS 430, for configuring a WiMAX paging cycle in such a manner as to allow the MS 430 to listening to both a CDMA 1× RAT and a WiMAX RAT with a single RF chain, in accordance with certain embodiments of the present disclosure. The operations 700 may be performed, for example, by an MS in an effort to allow the MS to monitor the paging listening intervals of both RATs while reducing conflict between the paging intervals of the RATs.

Operations begin, at 702, with the multi-mode MS 430 determining a period of the CDMA 1× paging cycle. By virtue of being registered with the CDMA 1× network, the MS 430 may know the CDMA 1× paging cycle parameter SLOT_CYCLE_INDEX. Accordingly, the MS 430 may be able to determine the duration of the CDMA 1× paging cycle by utilizing the SLOT_CYCLE_INDEX in conjunction with previously describe Equation 2.

At 704, the multi-mode MS 430 may determine a WiMAX paging cycle that may reduce the chance of a WiMAX paging interval 600 colliding with a CDMA 1× paging interval 500 based on the period of the CDMA 1× paging cycle. In determining the WiMAX paging cycle, the MS 430 may consider a WiMAX paging cycle that falls into one of three categories: a WiMAX paging cycle larger than the CDMA 1× paging cycle, a WiMAX paging cycle smaller than the CDMA 1× paging cycle, and a WiMAX paging cycle substantially equal in duration with the CDMA 1× paging cycle.

Having determined the WiMAX paging cycle, at 706, the MS 430 may send a DREG-REQ message to schedule the WiMAX paging cycle such that the chances of consecutive WiMAX paging intervals 600 conflicting with the paging intervals of a CDMA 1× network are reduced.

Subsequently, the MS 430 may enter an idle mode and wake-up and listen to the appropriate network according to the paging schedules of both networks. The MS 430 may also wake-up early and tune to whichever network's paging interval is about to begin in order to tune the RF chain and decode the paging messages in the paging interval.

Exemplary Determination of Paging Cycle

Exactly how a WiMAX paging cycle is determined may vary in different circumstances and, for certain embodiments, may depend on the relative length of the CDMA 1× paging cycle.

For example, when determining a WiMAX paging cycle that is larger than the CDMA 1× paging cycle, the MS 430 may select a WiMAX paging cycle that can generally be described by Equations 4a-b:

$$\text{Paging\_Cycle}_{WiMAX} = K^* \text{Paging\_Cycle}_{CDMA\_1\times} + T, \text{ or} \quad (4a)$$

$$\text{Paging\_Cycle}_{WiMAX} = K^* \text{Paging\_Cycle}_{CDMA\_1\times} - T, \quad (4b)$$

where K is a design factor which may be chosen depending on the need of power savings (as the larger the paging cycle the longer the possible sleep duration). Additionally, the parameter 'T' (in units of WiMAX frames), as described by Equation 5:

$$T = \frac{180 \text{ ms}}{\text{wmx\_frame}} + 5 + d, \quad (5)$$

may be understood to be an expansion or contraction of the paging cycle that accounts for a duration of the CDMA 1× paging interval 500 (i.e., 180 ms/wmx_frame), a duration of the WiMAX paging interval 600, and another design factor d. The design factor d (in units of WiMAX frames) may be employed to account for additional time that may be needed by the MS 430, for example, to account for MS tuning between networks. Note that Equation 5 may have a '+5' term. This term accounts for the WiMAX paging interval 600 which may be up to 5 frames.

Figure 8A:
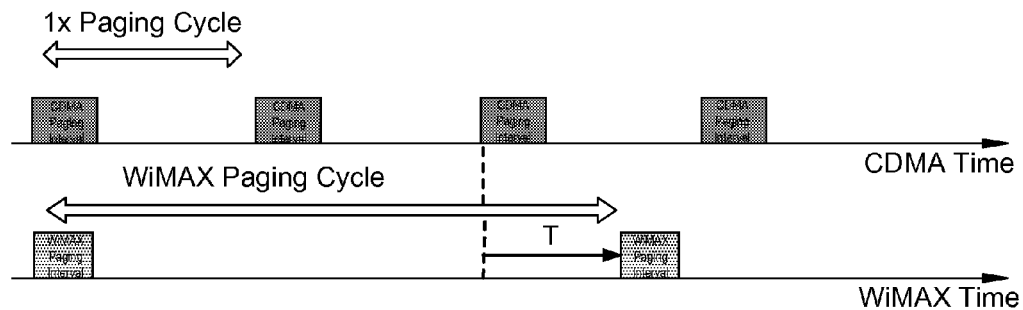
FIG. 8A-C illustrate configurations of WiMAX paging cycles such that conflict is reduced with CDMA 1× paging intervals.

FIG. 8A illustrates an example relationship between a CDMA 1× paging cycle and a WiMAX paging cycle, wherein the WiMAX paging cycle is larger than the CDMA 1× paging cycle. The illustrated example assumes the MS 430 employed Equation 4a, with the design factor K was selected to be 2 and the paging cycle was expanded by the parameter 'T.' The figure also shows that once a collision occurs, the subsequent WiMAX paging interval should not collide with a CDMA 1× paging interval due to the parameter 'T.'

When determining a WiMAX paging cycle that is smaller than the CDMA 1× paging cycle, the MS 430 may select a WiMAX paging cycle that can generally be described by Equations 6a-b:

$$\text{Paging\_Cycle}_{WiMAX} = \frac{\text{Paging\_Cycle}_{CDMA\_1x}}{L} + \text{CEILING}(T/L), \text{ or} \quad (6a)$$

$$\text{Paging\_Cycle}_{WiMAX} = \frac{\text{Paging\_Cycle}_{CDMA\_1x}}{L} - \text{CEILING}(T/L), \quad (6b)$$

where L is a design factor which may be chosen depending on the need of power savings. In certain embodiments, L may be chosen such that it divides evenly into the CDMA 1× paging cycle. As previously discussed, the parameter 'T' may be understood to be an expansion or contraction of the paging cycle and may be determined as described by Equation 5.

Figure 8B:
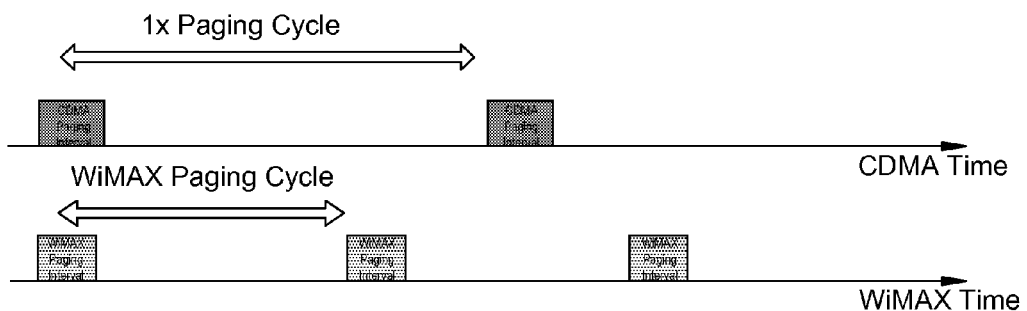

FIG. 8B illustrates an example relationship between a CDMA 1× paging cycle and a WiMAX paging cycle, wherein the WiMAX paging cycle is smaller than the CDMA 1× paging cycle. In the present example, the MS 430 employed Equation 6a, where the design factor L was selected to be 2 and the paging cycle was expanded by the term CEILING(T/L). As before, the figure also shows that once a collision occurs, the subsequent WiMAX paging interval should not collide with a CDMA 1× paging interval due to the parameter 'T.'

When determining a WiMAX paging cycle that is substantially equal in duration with the CDMA 1× paging cycle, the MS 430 may select a WiMAX paging cycle that can generally be described by Equations 7a-b:

$$\text{Paging\_Cycle}_{WiMAX} = \text{Paging\_Cycle}_{CDMA\_1\times} + T, \text{ or} \quad (7a)$$

$$\text{Paging\_Cycle}_{WiMAX} = \text{Paging\_Cycle}_{CDMA\_1\times} - T. \quad (7b)$$

Again, with the parameter 'T' generally representing an expansion or contraction of the paging cycle and may be determined as described by Equation 5.

Figure 8C:
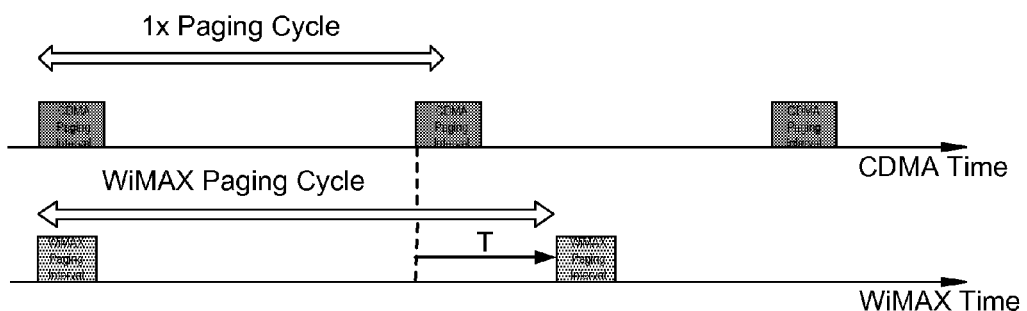

FIG. 8C illustrates an example relationship between a CDMA 1× paging cycle and a WiMAX paging cycle, wherein the WiMAX paging cycle is substantially equal in duration with the CDMA 1× paging cycle. In the present example, the MS 430 employed Equation 7a, where the paging cycle was expanded by the parameter 'T.' As before, the figure also shows that once a collision occurs, the subsequent WiMAX paging interval should not collide with a CDMA 1× paging interval due to the parameter 'T.'

Exemplary CDMA EVDO and Asynchronous WiMAX Overlaid Networks

While 1× and EVDO CDMA technologies are similar in their channel access methodology, the CDMA EVDO technology differs with respect to the parameters which govern idle mode timing. Accordingly, in an environment in which a CDMA EVDO network is overlaid on an asynchronous WiMAX network, it may be beneficial to configure WiMAX paging cycle in such a way as to avoid conflict between EVDO paging intervals and WiMAX paging intervals. However, the method by which that is done may differ from the previously described embodiments directed to CDMA 1× technologies.

Under the EVDO standard, the MS 430 may select a control channel cycle (CCC) which may enable the MS to configure the offset of CDMA EVDO paging cycle. The MS 430 may listen in the selected CCC for a page. Each CCC lasts approximately 426.67 ms and is divided into 256 slots, each of 1.67 ms.

Figures 9A, 9B:
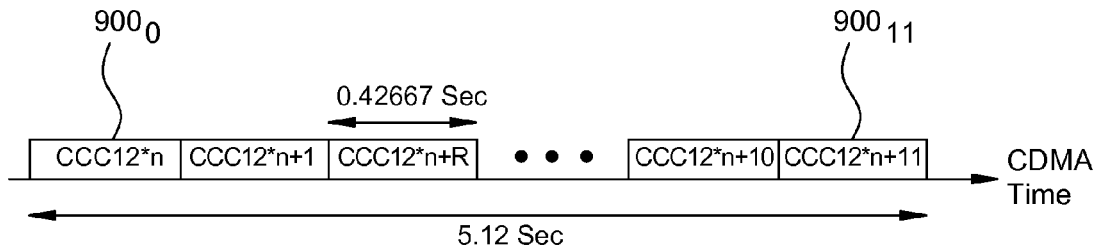
FIG. 9A-B illustrate components of a CDMA EVDO control channel cycle.

In EVDO rev 0, the idle state protocol may allow the MS 430 to wake-up for one control channel cycle every 5.12 seconds, where 12 CCCs 9000-11 are available during 5.12 seconds, as illustrated in FIG. 9A. Additionally, each CCC has an index starting from the beginning of the CDMA system time. An MS 430, in a CDMA EVDO network may wake-up on a CCC with index C where the value of C satisfies Equation 8:

$$(C+R) \bmod 12 = 0, \quad (8)$$

where the parameter 'R' may be set by either a random generation algorithm specified in the CDMA standard or an MS preferred value, called a Preferred CCC.

Under EVDO rev 0, an MS 430 may choose one of the previous two options by setting a Preferred CCC enable parameter. If the MS 430 decides to set the Preferred CCC, the MS 430 may use a generic configuration protocol in an EVDO configuration request message. However, under CDMA EVDO rev A, an enhanced idle mode protocol may allow the MS 430 to sleep for one of a plurality of possible periods, as illustrated in FIG. 9B. The sleep period may range from 4 slots (or 1/64 of a CCC) to 196,608 slots (or 768 CCCs). Despite the available choices, in the interest of power consumption, embodiments of the present disclosure focus on sleep periods longer than 1 CCC (i.e., a slot cycle value greater than or equal to 7).

Additionally, CDMA EVDO rev A protocols allow an MS 430 to enter an idle mode with graduated sleep periods. For example, the MS 430 may have 3 sleep periods of different lengths. The first sleep period Period1 may be one CCC, or 426.67 milliseconds, the second sleep period Period2 may be three CCCs, or 1.28 seconds, and the third sleep period Period3 may be six CCCs, or 2.56 seconds. However, the Period3 may represent the final sleep period and will be used for reference for the remainder of the disclosure and it is in units of slots.

CDMA EVDO rev A goes on to specify that an MS 430 may wake-up at a slot within a CCC described by Equation 9:

$$[T+256*R] \bmod \text{Period} = \text{Offset}. \tag{9}$$

This is in fact equivalent to CCC index C satisfying Equation 8, where P=Period3/256. It should be noted that Period3 may be configured properly under EVDO rev A.

However, since the frame number of different WiMAX BSs may not be identical at the same time in an asynchronous system, it is unlikely that a single WiMAX paging cycle could be configured such that the WiMAX paging interval never conflicts with the CDMA EVDO paging interval. Nevertheless, it may still be beneficial to reduce the conflict between the paging intervals of the two networks.

In order to allow the MS 430 to choose proper WiMAX paging parameters, embodiments proposes to configure the WiMAX paging cycle in such a way as to reduce conflicts between a WiMAX paging interval 600 and a CDMA EVDO paging interval.

Figure 10:
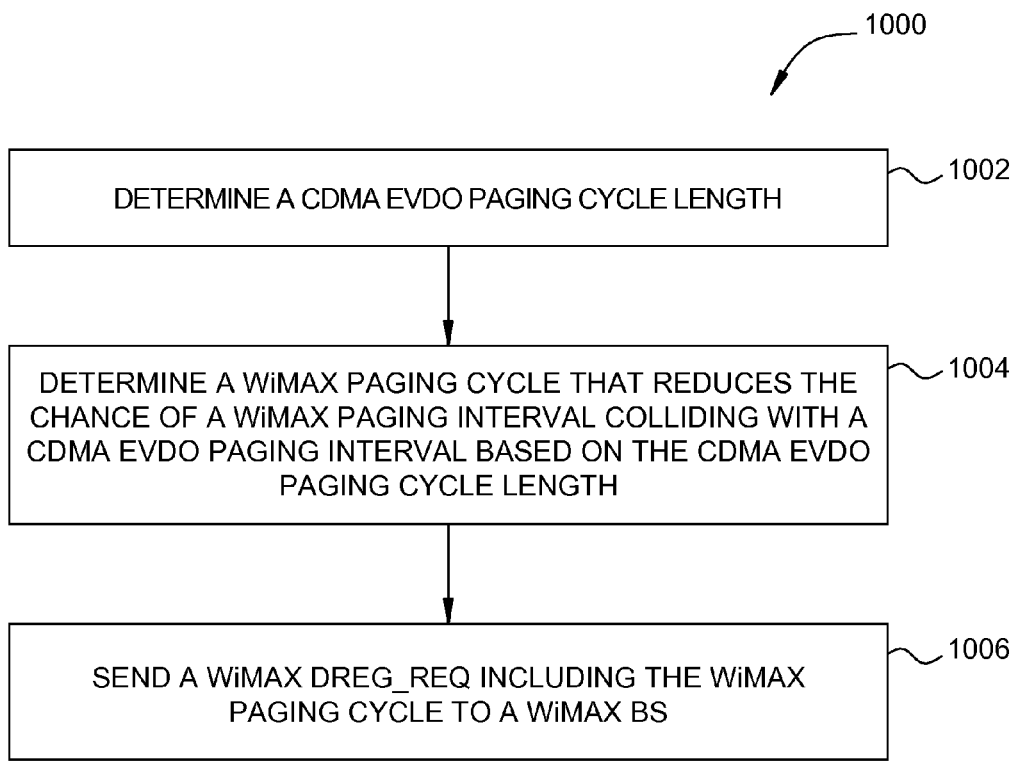
FIG. 10 illustrates example operations for configuring a CDMA EVDO paging interval.

FIG. 10 illustrates example operations 1000 that may be performed, for example, by a multi-mode MS 430, for configuring a WiMAX paging cycle in such a manner as to allow the MS 430 to listening to both a WiMAX RAT and a CDMA EVDO RAT with a single RF chain, in accordance with certain embodiments of the present disclosure. The operations 1000 may be performed, for example, by an MS in an effort to allow the MS to monitor the paging listening intervals of both RATs without conflict.

Operations begin, at 1002, with the multi-mode MS 430 determining a CDMA EVDO paging cycle length. After registering and joining the CDMA EVDO network, the MS 430 may know the CDMA EVDO paging cycle and be able to determine the duration of said cycle in units of WiMAX frames by utilizing either Equation 10a or 10b depending on the EVDO revision being employed, Rev 0 or Rev A, respectively:

$$\text{Paging\_Cycle}_{EVDO} = \frac{5.12 sec}{\text{wmx\_frame}}, \tag{10a}$$

$$\text{Paging\_Cycle}_{EVDO} = \frac{\text{Period3} \cdot 1.67 \text{ ms}}{\text{wmx\_frame}}. \tag{10b}$$

As previously discussed, in the interest of power consumption, embodiments of the present disclosure focus on sleep periods or paging cycles longer than 1 CCC, for example 1.28 seconds, where 1.28 seconds is the duration of 3 CCCs (or the sleep period associated with a slot cycle value equal to 7th.

At 1004, the multi-mode MS 430 may determine a WiMAX paging cycle that reduces the likelihood of a WiMAX paging interval 600 colliding with a CDMA EVDO paging interval 500, based on length of the CDMA EVDO paging cycle. At 1006, the multi-mode MS 430 may send a DREG_REQ including the determined paging cycle to a WiMAX BS.

As noted above, in determining the WiMAX paging cycle, the MS 430 may consider a WiMAX paging cycle that falls into one of three categories: a WiMAX paging cycle larger than the CDMA EVDO paging cycle, a WiMAX paging cycle smaller than the CDMA EVDO paging cycle, and a WiMAX paging cycle substantially equal in duration with the CDMA EVDO paging cycle.

When determining a WiMAX paging cycle that is larger than the CDMA EVDO paging cycle, the MS 430 may select a WiMAX paging cycle that can generally be described by Equations 11a-b:

$$\text{Paging\_Cycle}_{WiMAX} = K^* \text{Paging\_Cycle}_{EVDO} + T, \text{ or} \tag{11a}$$

$$\text{Paging\_Cycle}_{WiMAX} = K^* \text{Paging\_Cycle}_{EVDO} - T, \tag{11b}$$

where K is a design factor which may be chosen depending on the need of power savings. Additionally, the parameter 'T' (in units of WiMAX frames), as described by Equation 5:

$$T = \frac{426.67 \text{ ms}}{\text{wmx\_frame}} + 5 + d, \tag{12}$$

may be understood to be an expansion or contraction of the paging cycle that accounts for a duration of the CDMA EVDO paging interval, or a CCC (i.e., 426.67 ms/wmx_frame), a duration of the WiMAX paging interval 600, and a design (or margin) factor d. The design factor d (in units of WiMAX frames) may be employed to account for additional time that may be needed by the MS 430, for example, to account for MS tuning between networks. Note that Equation 12 may have a '+5' term. This term accounts for the WiMAX paging interval 600 which may be up to 5 frames.

Figure 11A:
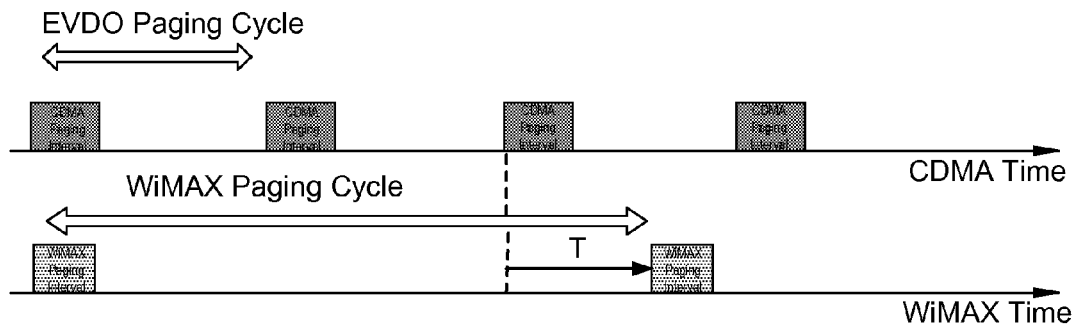
FIG. 11A-C illustrates configurations of WiMAX paging cycles such that conflict is reduced with CDMA EVDO paging intervals.

FIG. 11A illustrates an example relationship between a CDMA EVDO paging cycle and a WiMAX paging cycle, wherein the WiMAX paging cycle is larger than the CDMA EVDO paging cycle. In the present example, the MS 430 employed Equation 11a, where the design factor K was selected to be 2 and the paging cycle was expanded by the parameter 'T.' The figure also shows that once a collision occurs, the subsequent WiMAX paging interval should not collide with a CDMA EVDO paging interval due to the parameter 'T.'

When determining a WiMAX paging cycle that is smaller than the CDMA EVDO paging cycle, the MS 430 may select a WiMAX paging cycle that can generally be described by Equations 13a-b:

$$\text{Paging\_Cycle}_{WiMAX} = \frac{\text{Paging\_Cycle}_{EVDO}}{L} + \text{CEILING}(T/L), \text{ or} \tag{13a}$$

$$\text{Paging\_Cycle}_{WiMAX} = \frac{\text{Paging\_Cycle}_{EVDO}}{L} - \text{CEILING}(T/L), \tag{13b}$$

where L is a design factor which may be chosen depending on the need of power savings. In certain embodiments, L may be chosen such that it divides evenly into the CDMA EVDO paging cycle. As previously discussed, the parameter 'T' may be understood to be an expansion or contraction of the paging cycle and may be determined as described by Equation 12.

Figure 11B:
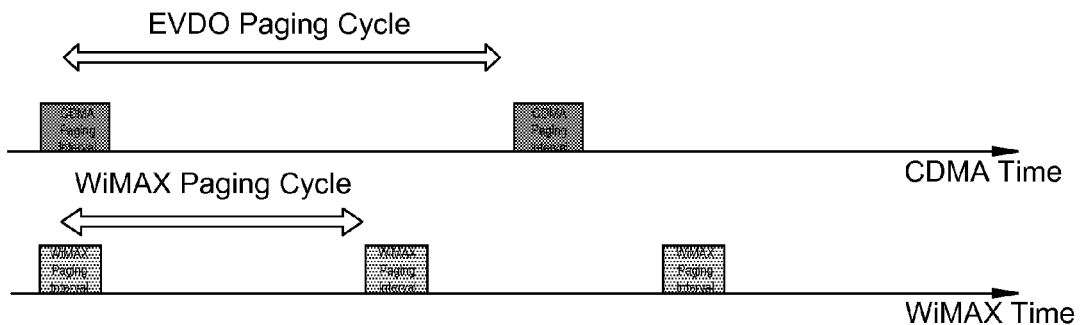

FIG. 11B illustrates an example relationship between a CDMA EVDO paging cycle and a WiMAX paging cycle, wherein the WiMAX paging cycle is smaller than the CDMA EVDO paging cycle. In the present example, the MS 430 employed Equation 13a, where the design factor L was selected to be 2 and the paging cycle was expanded by the term CEILING(T/L). As before, the figure also shows that once a collision occurs, the subsequent WiMAX paging interval should not collide with a CDMA EVDO paging interval due to the parameter 'T.'

When determining a WiMAX paging cycle that is substantially equal in duration with the CDMA EVDO paging cycle, the MS 430 may select a WiMAX paging cycle that can generally be described by Equations 14a-b:

$$\text{Paging\_Cycle}_{WiMAX} = \text{Paging\_Cycle}_{EVDO} + T, \text{ or} \quad (14a)$$

$$\text{Paging\_Cycle}_{WiMAX} = \text{Paging\_Cycle}_{EVDO} - T. \quad (14b)$$

As previously discussed, the parameter 'T' may be understood to be an expansion or contraction of the paging cycle and may be determined as described by Equation 12.

Figure 11C:
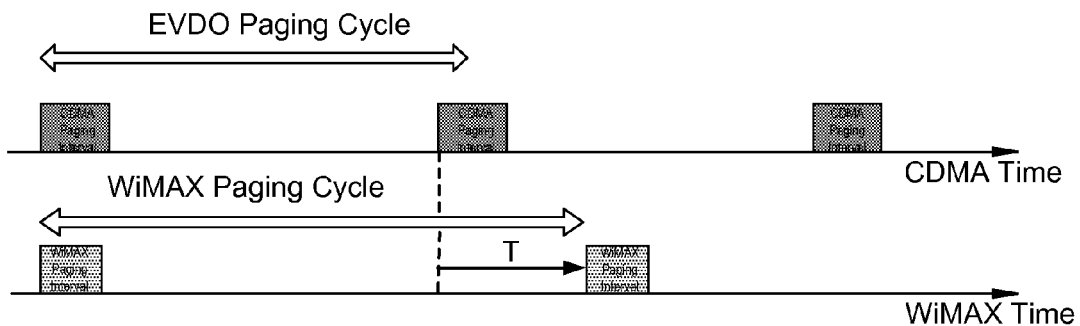

FIG. 11C illustrates an example relationship between a CDMA EVDO paging cycle and a WiMAX paging cycle, wherein the WiMAX paging cycle is substantially equal in duration with the CDMA 1× paging cycle. In the present example, the MS 430 employed Equation 14a, where the paging cycle was expanded by the parameter 'T.' As before, the figure also shows that once a collision occurs, the subsequent WiMAX paging interval should not collide with a CDMA EVDO paging interval due to the parameter 'T.'

Figure 12:
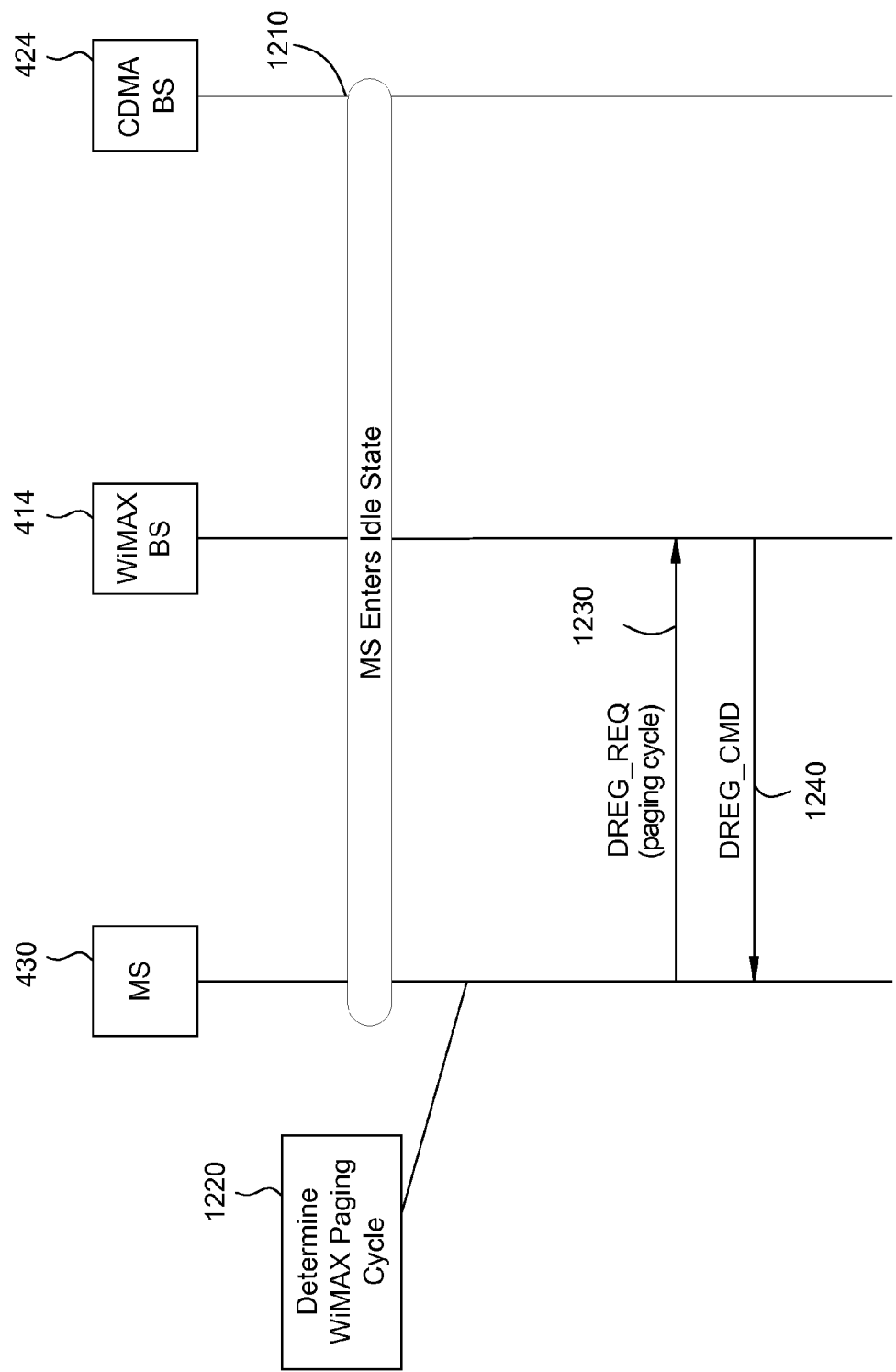
FIG. 12 illustrates example exchanges between a multi-mode mobile station and two base stations of differing radio access technologies.

FIG. 12 summarizes the procedures that may take place between the MS 430, the CDMA BS 424, and the WiMAX BS 414. The procedures begin with the MS 430 enters idle state 1210 with the CDMA BS 424, such as by closing the connection. At this point, the MS 430 can establish a paging cycle with periodic CDMA EVDO paging intervals 500 with the known CDMA paging cycle parameter.

The MS 430 may then, at 1220, determine a WiMAX paging cycle so that the WiMAX paging intervals 600 do not conflict with the established CDMA paging intervals 500. It should be noted that the methods and procedures associated with determining the WiMAX paging cycle may correspond with the operations described at 704 or 1004.

After determining a WiMAX paging cycle such that the WiMAX paging intervals 600 do not conflict with the CDMA paging intervals, the MS 430 may send a DREG-REQ 1230 to the WiMAX BS 414 including the WiMAX paging cycle. Additionally, the DREG-REQ, in accordance with some embodiments, may include a flag indicating the mandatory or optional nature of the WiMAX paging parameters. In response, the WiMAX BS 414 may send a DREG-CMD 1240 confirming the DREG-REQ of the MS 430.

The MS 430, now in an idle mode with respect to both the CDMA EVDO network and the WiMAX network, may wake-up in accordance with the paging cycles of both networks. Additionally, it may be possible for the MS 430 to wake-up and detect a change with respect to a serving BS. In this case, the MS 430 may need to stay with the new BS without switching over to listen to the paging interval of the other network. This may be done in order to acquire the new system overhead information, namely a System Parameter Message in the CDMA network or a Downlink Channel Descriptor (DCD) and an Uplink Channel Descriptor (UCD) in the WiMAX network. After acquiring the new system overhead information, the MS 430 may resume the regular dual paging interval schedules of the CDMA EVDO and WiMAX networks.

It should also be noted that embodiments of the present disclosure may not interfere with the MS 430 maintaining all of the registration or location update performance requirements in the CDMA and WiMAX networks. For example, if a periodic registration timer has expired, the MS 430 may immediately switch to the other network, if needed, to perform registration while suspending the dual paging schedules. However, after the registration is complete, the dual paging listening intervals may resume.

Figure 7A:
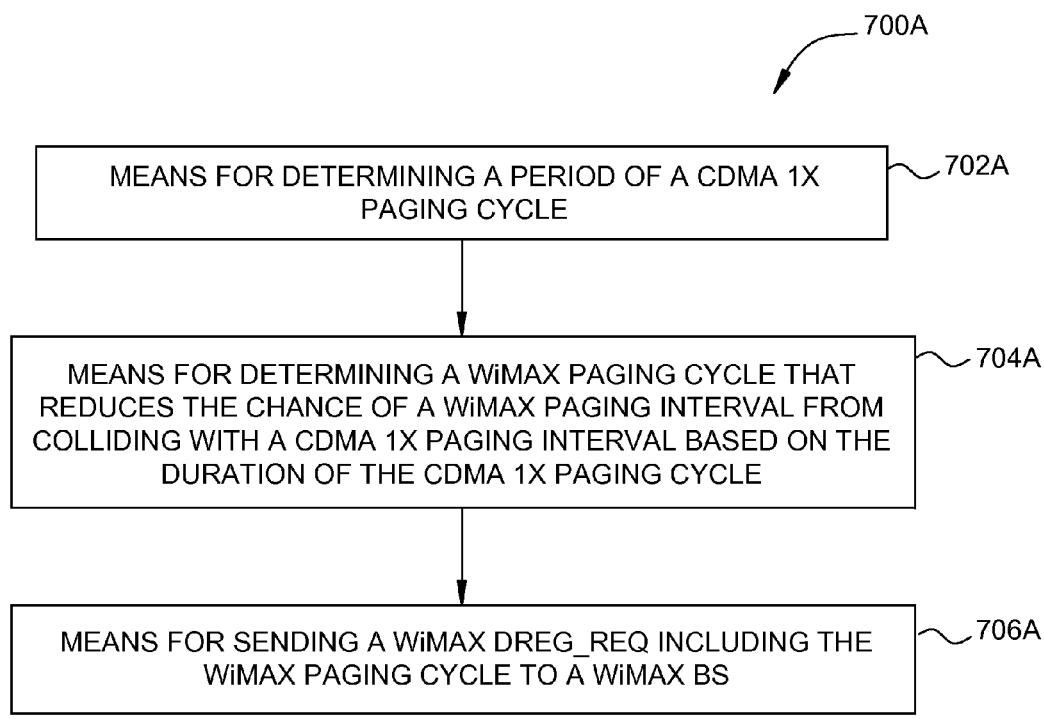
FIG. 7A is a block diagram of means corresponding to the example operations of FIG. 7.
Figure 10A:
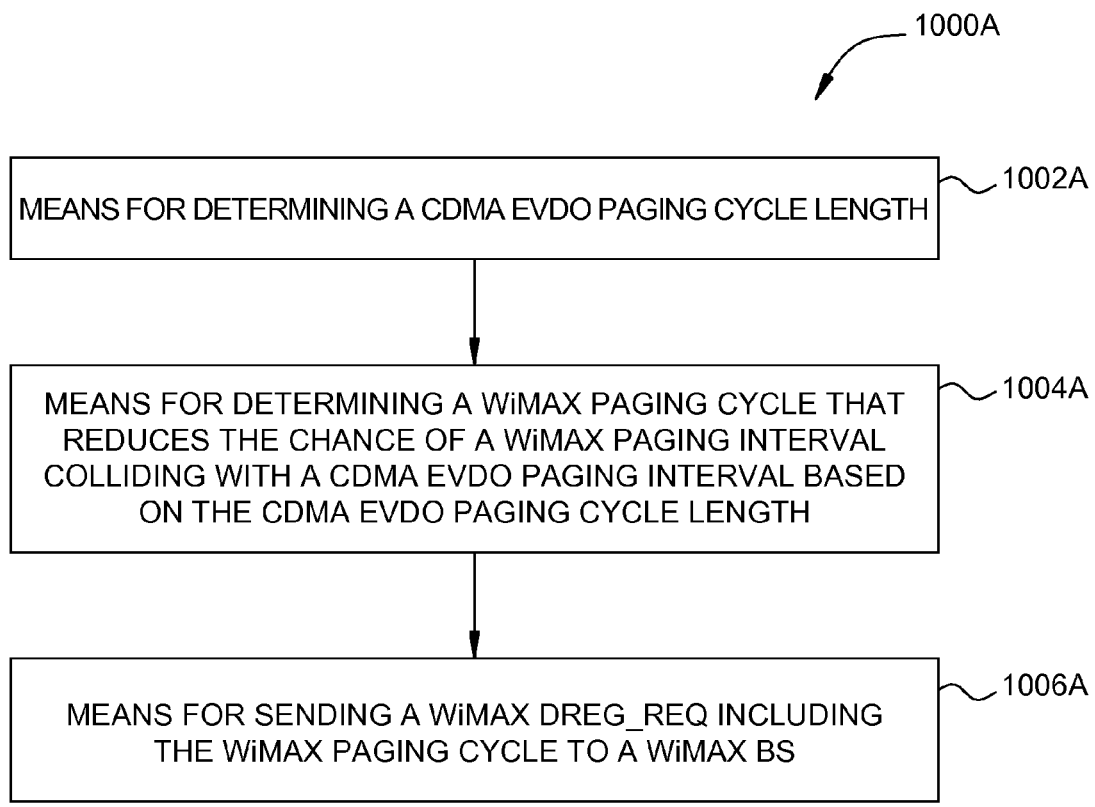
FIG. 10A is a block diagram of means corresponding to the example operations of FIG. 10.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 702-706 illustrated in FIG. 7 correspond to means-plus-function blocks 702A-706A illustrated in FIG. 7A. Similarly, blocks 1002-1006 illustrated in FIG. 10 correspond to means-plus-function blocks 1002A-1006A illustrated in FIG. 10A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for communicating using first and second networks with first and second radio access technologies (RATs), comprising:
    determining a first paging cycle for the first network; and
    determining a second paging cycle for the second network in an effort to avoid consecutive collisions between paging intervals of the first and second networks, wherein the second paging cycle is determined based on a scaling factor applied to the first paging cycle and an offset value, the offset value determined based on a relationship between a frame interval of the second network and the first paging cycle.

2. The method of claim 1, wherein the scaling factor is an integer value of one or greater.

3. The method of claim 2, wherein the first paging cycle is multiplied by the scaling factor.

4. The method of claim 2, wherein the first paging cycle is divided by the scaling factor.

5. The method of claim 1, further comprising determining the offset value as a function of a length of a paging listening interval of the first network.

6. The method of claim 5, wherein the offset value is further determined based on a factor in units of frames of the first network.

7. The method of claim 1, wherein:
    the first RAT comprises a CDMA 1× RAT; and
    the second RAT comprises an asynchronous WiMAX RAT, wherein WiMAX frame numbers are not synchronized across all base stations in the second network.

8. The method of claim 1, wherein:
    the first RAT comprises a CDMA EVDO RAT; and
    the second RAT comprises an asynchronous WiMAX RAT, wherein WiMAX frame numbers are not synchronized across all base stations in the second network.

9. The method of claim 1, wherein:
    the first RAT is a CDMA EVDO RAT and the second RAT is a WiMAX RAT; and
    wherein the second paging cycle for the second network comprises a WiMAX paging cycle that is greater than a CDMA EVDO sleep cycle.

10. The method of claim 1, wherein:
    the first RAT is a CDMA EVDO RAT and the second RAT is a WiMAX RAT; and
    wherein the second paging cycle for the second network comprises a WiMAX paging cycle that is less than a CDMA EVDO sleep cycle.

11. The method of claim 1, wherein:
    the first RAT is a CDMA EVDO RAT and the second RAT is a WiMAX RAT; and
    the offset value is calculated by generating a quotient by dividing a CDMA EVDO control channel cycle (CCC) period by a WiMAX frame period, applying a ceiling function to the quotient, and adding a maximum WiMAX paging listening interval and a margin factor to the result obtained by applying the ceiling function.

12. An apparatus for communicating using first and second networks with first and second radio access technologies (RATs), comprising:
    tangible logic for determining a first paging cycle for the first network; and
    tangible logic for determining a second paging cycle for the second network in an effort to avoid consecutive collisions between paging intervals of the first and second networks, wherein the second paging cycle is determined based on a scaling factor applied to the first paging cycle and an offset value, the offset value determined based on a relationship between a frame interval of the second network and the first paging cycle.

13. The apparatus of claim 12, wherein the scaling factor is an integer value of one or greater.

14. The apparatus of claim 13, wherein the first paging cycle is multiplied by the scaling factor.

15. The apparatus of claim 13, wherein the first paging cycle is divided by the scaling factor.

16. The apparatus of claim 12, further comprising tangible logic for determining the offset value as a function of a length of a paging listening interval of the first network.

17. The apparatus of claim 16, wherein the offset value is further determined based on a factor in units of frames of the first network.

18. The apparatus of claim 12, wherein:
the first RAT comprises a CDMA 1× RAT; and
the second RAT comprises an asynchronous WiMAX RAT, wherein WiMAX frame numbers are not synchronized across all base stations in the second network.

19. The apparatus of claim 12, wherein:
the first RAT comprises a CDMA EVDO RAT; and
the second RAT comprises an asynchronous WiMAX RAT, wherein WiMAX frame numbers are not synchronized across all base stations in the second network.

20. The apparatus of claim 12, wherein:
the first RAT is a CDMA EVDO RAT and the second RAT is a WiMAX RAT; and
wherein the second paging cycle for the second network comprises a WiMAX paging cycle that is greater than a CDMA EVDO sleep cycle.

21. The apparatus of claim 12, wherein:
the first RAT is a CDMA EVDO RAT and the second RAT is a WiMAX RAT; and
wherein the second paging cycle for the second network comprises a WiMAX paging cycle that is less than a CDMA EVDO sleep cycle.

22. The apparatus of claim 12, wherein:
the first RAT is a CDMA EVDO RAT and the second RAT is a WiMAX RAT; and
the offset value is calculated by generating a quotient by dividing a CDMA EVDO control channel cycle (CCC) period by a WiMAX frame period, applying a ceiling function to the quotient, and adding a maximum WiMAX paging listening interval and a margin factor to the result obtained by applying the ceiling function.

23. An apparatus for communicating using first and second networks with first and second radio access technologies (RATs), comprising:
means for determining a first paging cycle for the first network; and
means for determining a second paging cycle for the second network in an effort to avoid consecutive collisions between paging intervals of the first and second networks, wherein the second paging cycle is determined based on a scaling factor applied to the first paging cycle and an offset value, the offset value determined based on a relationship between a frame interval of the second network and the first paging cycle.

24. The apparatus of claim 23, wherein the scaling factor is an integer value of one or greater.

25. The apparatus of claim 24, wherein the first paging cycle is multiplied by the scaling factor.

26. The apparatus of claim 24, wherein the first paging cycle is divided by the scaling factor.

27. The apparatus of claim 23, further comprising means for determining the offset value as a function of a length of a paging listening interval of the first network.

28. The apparatus of claim 27, wherein the offset value is further determined based on a factor in units of frames of the first network.

29. The apparatus of claim 23, wherein:
the first RAT comprises a CDMA 1× RAT; and
the second RAT comprises an asynchronous WiMAX RAT, wherein WiMAX frame numbers are not synchronized across all base stations in the second network.

30. The apparatus of claim 23, wherein:
the first RAT comprises a CDMA EVDO RAT; and
the second RAT comprises an asynchronous WiMAX RAT, wherein WiMAX frame numbers are not synchronized across all base stations in the second network.

31. The apparatus of claim 23, wherein:
the first RAT is a CDMA EVDO RAT and the second RAT is a WiMAX RAT; and
wherein the second paging cycle for the second network comprises a WiMAX paging cycle that is greater than a CDMA EVDO sleep cycle.

32. The apparatus of claim 23, wherein:
the first RAT is a CDMA EVDO RAT and the second RAT is a WiMAX RAT; and
wherein the second paging cycle for the second network comprises a WiMAX paging cycle that is less than a CDMA EVDO sleep cycle.

33. The apparatus of claim 23, wherein:
the first RAT is a CDMA EVDO RAT and the second RAT is a WiMAX RAT; and
the offset value is calculated by generating a quotient by dividing a CDMA EVDO control channel cycle (CCC) period by a WiMAX frame period, applying a ceiling function to the quotient, and adding a maximum WiMAX paging listening interval and a margin factor to the result obtained by applying the ceiling function.

34. A computer-program product for communicating using first and second networks with first and second radio access technologies (RATs), comprising a tangible computer readable medium having instructions stored thereon, the instructions being executable by one or more processors and the instructions comprising:
instructions for determining a first paging cycle for the first network; and
instructions for determining a second paging cycle for the second network in an effort to avoid consecutive collisions between paging intervals of the first and second networks, wherein the second paging cycle is determined based on a scaling factor applied to the first paging cycle and an offset value, the offset value determined based on a relationship between a frame interval of the second network and the first paging cycle.

35. The computer-program product of claim 34, wherein the scaling factor is an integer value of one or greater.

36. The computer-program product of claim 35, wherein the first paging cycle is multiplied by the scaling factor.

37. The computer-program product of claim 35, wherein the first paging cycle is divided by the scaling factor.

38. The computer-program product of claim 34, wherein the instructions further comprise instructions for determining the offset value as a function of a length of a paging listening interval of the first network.

39. The computer-program product of claim 38, wherein the offset value is further determined based on a factor in units of frames of the first network.

40. The computer-program product of claim 34, wherein:
the first RAT comprises a CDMA 1× RAT; and
the second RAT comprises an asynchronous WiMAX RAT, wherein WiMAX frame numbers are not synchronized across all base stations in the second network.

41. The computer-program product of claim 34, wherein:
the first RAT comprises a CDMA EVDO RAT; and
the second RAT comprises an asynchronous WiMAX RAT, wherein WiMAX frame numbers are not synchronized across all base stations in the second network.

42. The computer-program product of claim 34, wherein:
the first RAT is a CDMA EVDO RAT and the second RAT is a WiMAX RAT; and
wherein the second paging cycle for the second network comprises a WiMAX paging cycle that is greater than a CDMA EVDO sleep cycle.

43. The computer-program product of claim 34, wherein:
the first RAT is a CDMA EVDO RAT and the second RAT is a WiMAX RAT; and
wherein the second paging cycle for the second network comprises a WiMAX paging cycle that is less than a CDMA EVDO sleep cycle.

44. The computer-program product of claim 34, wherein:
the first RAT is a CDMA EVDO RAT and the second RAT is a WiMAX RAT; and
the offset value is calculated by generating a quotient by dividing a CDMA EVDO control channel cycle (CCC) period by a WiMAX frame period, applying a ceiling function to the quotient, and adding a maximum WiMAX paging listening interval and a margin factor to the result obtained by applying the ceiling function.

45. The method of claim 1, wherein the determining steps are performed by a multi-mode mobile station (MS).

46. The method of claim 45, further comprising:
communicating the second paging cycle from the MS to a base station of the second network in a request to establish the paging interval of the second network.

47. The apparatus of claim 23, wherein the means for determining a first paging cycle and the means for determining a second paging cycle are included in a multi-mode mobile station (MS).

48. The apparatus of claim 47, further comprising:
means for communicating the second paging cycle from the MS to a base station of the second network in a request to establish the paging interval of the second network.

* * * * *